UNITED STATES PATENT OFFICE 2,370,437

NITRATION PROCESS

Marshall F. Acken, Wilmington, Del., and John C. Vyverberg, Jr., Woodbury, N. J., assignors to E. I. du Pont de Nemours & Company, Wilmington, Del., a corporation of Delaware No Drawing. Application February 24, 1943, Serial No. 476,916

2 Claims. (Cl. 260—467)

This invention relates to a process for the nitration of solid polyhydroxy alcohols and in particular to a process for the nitration of pentaerythritol.

It is well known that this can be done either by means of strong nitric acid alone or combined with a dehydrating agent such as sulfuric acid. These methods as carried out heretofore are characterized by a serious disadvantage in that any substantial production requires considerable equipment and labor.

It is an object of the present invention to improve the process of nitration with strong nitric acid alone. Another object is to provide a novel and useful process where by pentaerythritol tetranitrate is manufactured at an increased rate of production. A further object is an economical and safe process for the nitration of pentaerythritol to pentaerythritol tetranitrate, which process is characterized by a substantial decrease in the time required to nitrate a given quantity of said alcohol to said nitrate with a substantially low ratio of acid to pentaerythritol. An additional object is such a process in which nitric acid is the sole nitrating agent and in which no dehydrating agent is employed. Other objects, features and advantages will be apparent or will appear hereinafter.

We have found that the foregoing objects are accomplished and the disadvantages overcome by reacting pentaerythritol with nitric acid at a temperature above 100° F. We prefer to employ nitric acid of at least 90% strength and of such amount that the ratio of the acid to pentaerythritol is at least 4 and preferably between about 4 and 5. Whereas we prefer to employ nitrating temperature between 100 and 140° F. we may operate as high as the boiling point of nitric acid. Preferably the charge is agitated throughout the nitration.

The pentaerythritol tetranitrate may be separated from the spent acid by filtration or by drowning in water. This crystalline material is freed substantially from acid by washing with water, then with a weak water-soluble alkali solution, for example sodium carbonate, and subsequently with water. Following the removal of acid the crude material is dried and refined. Acetone or other suitable solvent may be employed in the refining process.

The principles of our improved process will perhaps be best understood by reference to the following illustrative example, which however is not to be construed as a limitation on this invention. Where "parts" is used herein, "parts by weight" is meant.

Example

Cooling water was turned on and 420 parts nitric acid of 94% strength was introduced into the nitrator. The amount of acid was such that the ratio of nitric acid to pentaerythritol was 4.29. The agitator was started and the agitator speed adjusted to 120 R. P. M. •92 parts pentaerythritol, which had been screened previously through a 14-mesh screen was used in each charge. About 45 parts pentaerythritol was added to the nitrator at such a rate that the temperature in the nitrator gradually rose to 110° F. This required about 12 minutes. Time was allowed for the temperature rise to cease before each succeeding increment of material was added. After reaching 110° F. the charge was maintained at about said temperature from 12 to 14 minutes during which time approximately 30 parts pentaerythritol was added to the nitrator. During the following 14 minutes, approximately, the remainder of the 92 parts pentaerythritol was added in like manner to the charge and the temperature gradually reduced. The pentaerythritol was introduced into the acid in finely divided and well-dispersed particles and not in large unitary quantities. The entire 92 parts of pentaerythritol tetranitrate was introduced in 35 to 40 minutes. The pentaerythritol thus obtained was separated from the spent acid by filtering or drowning in water. To recover the spent acid the charge was passed onto a nutsch and filtered. The crude product was, washed with water, then with a weak water-soluble alkali solution, such as sodium carbonate for example, and subsequently with water in order to remove the acid. After the removal of acid, the nitrate was dried by suction on the nutsch for about 15 minutes. The dried material was refined by means of acetone treatment or other suitable refining means. About 210 parts refined pentaerythritol tetranitrate per charge was obtained.

We wish to emphasize that the example cited is for the purpose of illustration and clarity only and is not intended to limit our invention to the specific conditions mentioned, since many departures within the scope of this invention may be made from said example.

According to our invention we are able to complete the entire nitration cycle in a comparatively short period of time, whereas in the methods heretofore employed, in which no dehydrating agent is used and in which similar equipment is employed, the nitration cycle is substantially longer. Moreover, we are able to lessen substantially the time of nitration without a sacrifice in percentage yield and without increasing the acid ratio or the hazard involved in the manufacture of said compound.

The process of this invention is applicable to the preparation of high quality pentaerythritol tetranitrate either from refined pentaerythritol (melting between 250 and 260° C.) or from the technical grade (melting between 235 and 250° C.). However, the refined material is preferred, since difficulty may sometimes be encountered in the control of the nitrated product when the technical grade is employed.

While we have stated herein that the acid ratio should be at least 4 and preferably between 4 and 5, any acid ratio desired may be employed so long as it is sufficiently high to impede substantially the formation of unstable oxidation products. Acid ratios as used herein are computed on the basis of 100% nitric acid. Likewise, the amount of pentaerythritol may be varied somewhat, provided a sufficiently high acid ratio is obtained.

It should be understood, therefore, that the present invention is not limited to the specific operating conditions disclosed herein but that it extends to all equivalent conditions which may be considered within the general purport of the instant disclosure as limited only by the general proclivity of the specification and the scope of the appended claims.

We claim:

1. The process for the production of pentaerythritol tetranitrate which comprises reacting pentaerythritol with nitric acid at a temperature above 100° F.

2. A method of manufacturing pentaerythritol tetranitrate which comprises reacting pentaerythritol with nitric acid of at least 90% strength at a temperature above 100° F., the ratio of reactants being one part pentaerythritol to between 4 an 5 parts nitric acid.

MARSHALL F. ACKEN.
JOHN C. VYVERBERG, Jr.